US007495547B2

(12) United States Patent
Lich et al.

(10) Patent No.: US 7,495,547 B2

(45) Date of Patent: Feb. 24, 2009

(54) EMERGENCY-CALL DEVICE FOR A MOTOR VEHICLE

(75) Inventors: Thomas Lich, Schwaikheim (DE); Frank Mack, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/558,807

(22) PCT Filed: Mar. 25, 2004

(86) PCT No.: PCT/DE2004/000614

§ 371 (c)(1),
(2), (4) Date: Dec. 4, 2006

(87) PCT Pub. No.: WO2004/111962

PCT Pub. Date: Dec. 23, 2004

(65) Prior Publication Data

US 2007/0096886 A1 May 3, 2007

(30) Foreign Application Priority Data

May 28, 2003 (DE) ................................ 103 24 216

(51) Int. Cl.
*B60Q 1/00* (2006.01)
*H04Q 7/20* (2006.01)

(52) U.S. Cl. ..................... 340/425.5; 340/436; 455/460

(58) Field of Classification Search ................. 340/467, 340/463, 464, 466, 457.1, 459, 539.12, 667, 340/404.1-404.2, 425.5, 426.15, 426.17, 340/436, 437, 457, 471, 472, 473; 701/300-302, 701/45; 455/460

See application file for complete search history.

(56) References Cited

U.S. PATENT DOCUMENTS

| | | | | |
|---|---|---|---|---|
| 6,580,908 | B1 * | 6/2003 | Kroll et al. | 455/435.1 |
| 6,711,399 | B1 * | 3/2004 | Granier | 455/404.1 |
| 6,737,964 | B2 * | 5/2004 | Samman et al. | 340/436 |
| 6,816,766 | B2 * | 11/2004 | Sala et al. | 701/45 |
| 6,950,022 | B2 * | 9/2005 | Breed | 340/552 |
| 2002/0037707 | A1 * | 3/2002 | Yoshioka et al. | 455/404 |
| 2002/0198645 | A1 | 12/2002 | Kuwahara et al. | 701/45 |
| 2003/0040859 | A1 * | 2/2003 | Farmer | 701/45 |
| 2003/0085810 | A1 * | 5/2003 | Bullinger et al. | 340/576 |

FOREIGN PATENT DOCUMENTS

| | | |
|---|---|---|
| DE | 44 21 508 | 12/1994 |
| DE | 199 17 207 | 9/2001 |
| JP | 11 355478 | 12/1999 |

* cited by examiner

*Primary Examiner*—Benjamin C Lee
*Assistant Examiner*—Jennifer Mehmood
(74) *Attorney, Agent, or Firm*—Kenyon & Kenyon LLP

(57) ABSTRACT

An emergency-call device for a motor vehicle has a sensor system for detecting the accelerations acting upon the vehicle and its occupants, an analyzer unit and a transmitter unit for automatically placing an emergency call. Such an emergency-call device is to be equipped with devices for estimating the type and extent of the occupants' injuries, a model of the occupants being used as a basis. The thus obtained information about injury type and extent is transmitted automatically together with the emergency call to a rescue coordination center, so that appropriate relief measures may be taken rapidly.

14 Claims, 2 Drawing Sheets

EMERGENCY-CALL DEVICE FOR A MOTOR VEHICLE

FIELD OF THE INVENTION

The present invention relates to an emergency-call device for a motor vehicle having a sensor system for detecting the accelerations acting upon the vehicle and its occupants, and having an analyzer unit and a transmitter unit for automatically placing an emergency call.

BACKGROUND INFORMATION

German Patent No. 199 17 207 describes an emergency-call device for a motor vehicle, which sends out an emergency message to a rescue coordination center in the event of an accident. The vehicle is equipped with a sensor system for detecting translational accelerations, rotational accelerations, changes in the vehicle body's shape, braking operations, and/or steering motions. Critical driving situations, accidents in particular, are recognizable by analyzing sensor data to enable automatic placement of an emergency call. The geographic position of the vehicle involved in the accident is transmitted to the rescue coordination center together with the emergency call. According to German Patent No 199 17 207, the emergency message should also contain information for initiating appropriate relief measures. Examples of this type of additional information include the vehicle ID, the vehicle type, the number of occupants, possible acute sicknesses of vehicle occupants, the sequence and severity of the accident, and the severity and extent of injuries of the vehicle's occupants.

The manner in which the type and extent of the individual occupants' injuries may be determined is not specified.

SUMMARY OF THE INVENTION

The present invention proposes a way of automatically and relatively reliably estimating the type and extent of injuries of the vehicle's occupants to permit suitable relief measures to be taken rapidly.

According to the present invention, a model is used for each individual occupant of the vehicle as a basis for estimating the type and extent of injuries. The model is used to calculate the effect of the accelerations acting on the vehicle, the occupants, or an appropriate dummy, i.e., which motions the particular occupant executes and what possibly limits these motions. Interactions both with essentially rigid vehicle components, such as the vehicle body, headrests, and steering wheel, and with restraining means present in the vehicle, such as air bags, seat belt systems and seat belt tensioners, are taken into account. The extent of the injuries may then be estimated for each individual occupant using the known AIS and MAIS methods, defined by law, for calculating injury severity. The accuracy of this estimate, i.e., the possible details in determining the injuries occurring on the individual body parts, depends on how accurately the model reproduces the constitution of the particular occupants, such as size, weight, proportions, physical build, etc.

In the event of an accident, the emergency-call device according to the present invention automatically places an emergency call, which includes the as detailed as possible description or estimate of the injuries of the individual occupants of the vehicle. Using this information, the rescue coordination center is able to initiate appropriate relief measures. Thus, knowing the number of occupants and the number of probably injured individuals, it is possible to estimate the number of rescue vehicles needed. On the basis of the information regarding the type and severity of the injuries, it is possible to send out an emergency physician specializing in the particular pattern of injuries. If surgery seems to be urgently needed, preparations may start immediately upon receipt of the emergency call, including the search for an appropriate medical team and donated organ.

The model used as a basis for estimating the type and extent of the occupants' injuries may be a standard model which represents the body of an occupant in the form of five or eight linked mass elements for head, trunk, upper limbs, lower limbs, and feet, for example. Within a standard model, average values for the sizes and weights of the individual mass elements are assumed.

The estimates of injury type and extent may, however, be considerably improved if an individualized model which is adapted to the constitution of the vehicle occupant at least in some features is used for each vehicle occupant. In this context, it has proven to be advantageous to provide an interior sensing system, which delivers appropriate information regarding the vehicle occupants.

If such an interior sensing system includes means for detecting seat occupancy, the rescue coordination center may be automatically informed, in the event of an accident, which vehicle seats are occupied, i.e., the number of occupants in the vehicle involved in the accident. In the case of vehicle seats known for sure to be unoccupied, no estimate of the type and extent of injuries is needed.

To detect seat occupancy, sensor mats, known as occupant classification mats, may be used, for example; these are built into the individual vehicle seats and detect the weight distribution in the seat. These sensor mats not only make it possible to determine whether a vehicle seat is occupied but also to estimate the weight of the particular occupant and permit conclusions to be drawn regarding the current seat position. Other sensor systems may be used for measuring weight, such as absolute weight measuring sensors. All this information may be used for modifying the occupant model. Furthermore, by analyzing the pressure distribution in the vehicle seat, it is possible to recognize whether a child seat is mounted there. However, interior sensing may also include means for automatic child seat recognition based on transponder technology. In this case, the child seat must be equipped with a transponder which sends back a recognition signal when an antenna provided for checking transmits a signal. By analyzing the recognition signal, it may be determined whether a child seat is located on a certain vehicle seat, as well as the type of child seat, i.e., a seat for an infant or a toddler. The model for estimating injury type and extent may then be modified accordingly.

In a particularly advantageous variant of the present invention, the interior sensing system includes a stereo video camera. By analyzing the video data, reliable conclusions may be drawn regarding the type of seat occupancy and the accident sequence, because in this case all vehicle occupants may be detected by a sensor, and their paths and interactions with the restraining means may be traced even during the accident. By analyzing the detected occupants, important input quantities for the occupant model, such as the proportions of the different body parts, may be determined. In addition, the type and extent of injuries may be determined in greater detail by analyzing the video images.

As mentioned previously, the more information that is available about the constitution of the particular occupant, the better the estimate of injury type and extent. Therefore, it is particularly advantageous if the motor vehicle is equipped with means for inputting individual-specific data of at least one user, for example, for identification of the driver. In this case, individual-specific data, such as information about size, age, blood type, or diseases of the user may also be taken into account in estimating injury type and extent and transmitted to the rescue coordination center.

Not only the quality of the occupant model, but also the accuracy in detecting the accident sequence are essential for the as realistic and detailed as possible estimate of injury type and extent. If the vehicle is equipped with restraining means, it has been found advantageous if the information about the type of restraining means used and/or the time of deployment is taken into account in estimating the type and extent of the occupants' injuries.

An advantageous refinement of the emergency-call device according to the present invention is not only capable of placing an automatic emergency call including information about the type and extent of the vehicle occupants' injuries, but also of supporting a first aid provider at the site of the accident via information about applicable first aid measures. This information is read from a database on the basis of the previously determined type and extent of the occupants' injuries and made available via an optical and/or acoustic output system. The database may be stored in the control unit of the motor vehicle, or it may be an external database, means for bidirectional communication with this external database being necessarily provided.

The emergency-call device according to the present invention may also advantageously establish communication with the rescue coordination center which then may support the first aid provider with advice. In this context, it has been found advantageous if the motor vehicle has a camera system, for example, for interior sensing, which may be simply removed after the accident, so that the first aid provider is able to send detailed images of the injured persons to the rescue coordination center. The rescue coordination center is then able to support the first aid provider in a more specific manner.

DETAILED DESCRIPTION

Figure 1:
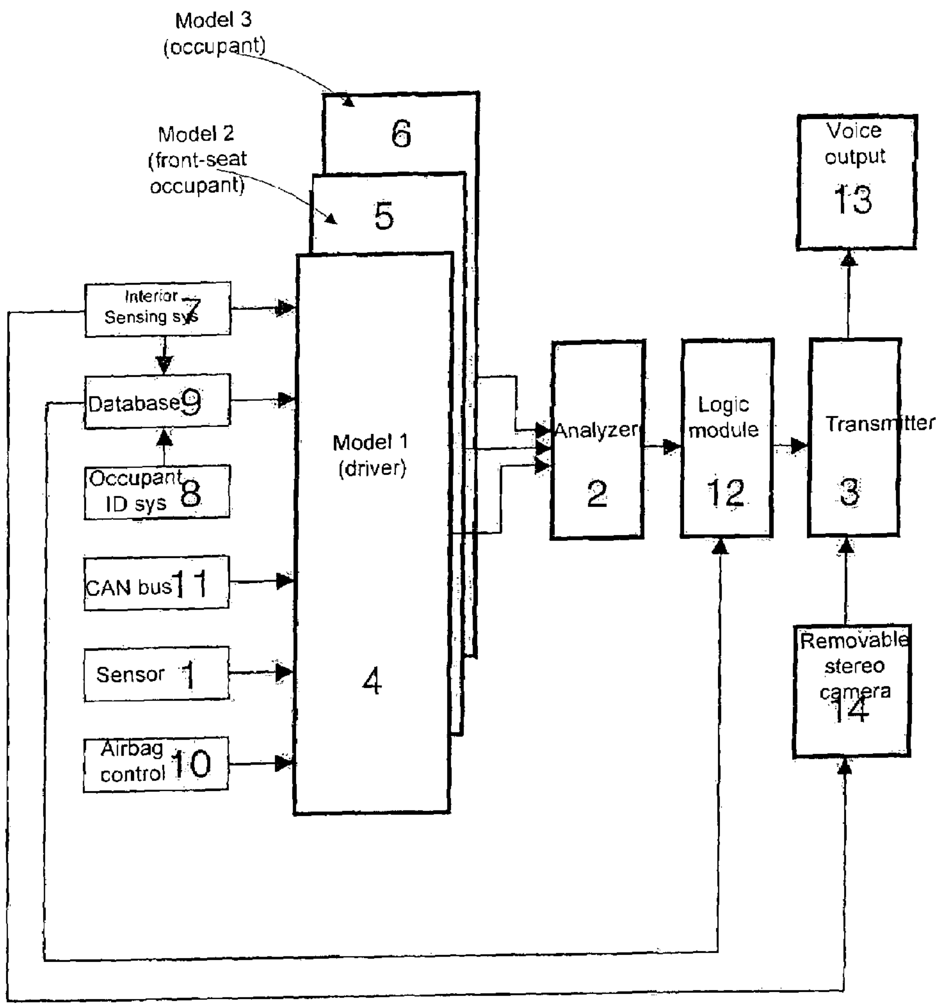
FIG. 1 shows a block diagram of an emergency-call device according to the present invention.

The emergency-call device for a motor vehicle shown in FIG. 1 in the form of a block diagram includes a sensor system 1 for detecting accelerations acting on the vehicle and its occupants. This may be the sensor system of the air bag controller, for example. The acceleration signals are analyzed by an analyzer unit 2 to recognize dangerous situations and even the occurrence of an accident in particular. In this case a transmitter unit 3 is activated, which automatically places an emergency call containing, for example, information about the position of the vehicle involved in the accident.

In the event of an accident, the acceleration signals detected by sensor system 1 are also used for estimating the type and extent of the vehicle occupants' injuries, and this information is transmitted to a rescue coordination center together with the emergency call, i.e., also automatically.

To estimate injury type and extent, the way the accelerations detected by sensor system 1 during the accident act upon a model for the particular vehicle occupant is computed according to the present invention. In the exemplary embodiment presented here, three models 4, 5, and 6 are provided: one model 4 for the driver, one model 5 for the front-seat passenger, and one model 6 for further occupants.

Figure 2:
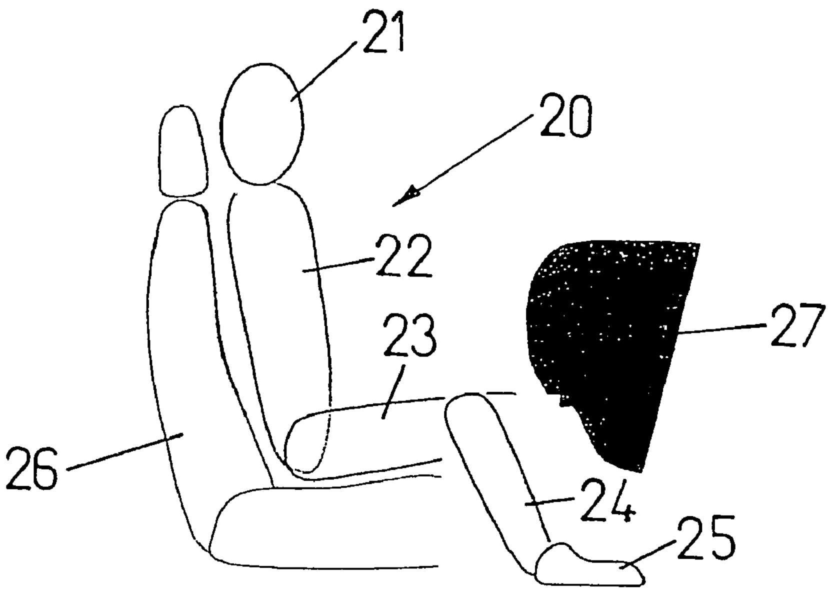
FIG. 2 shows the model of an occupant before an accident.
Figure 3:
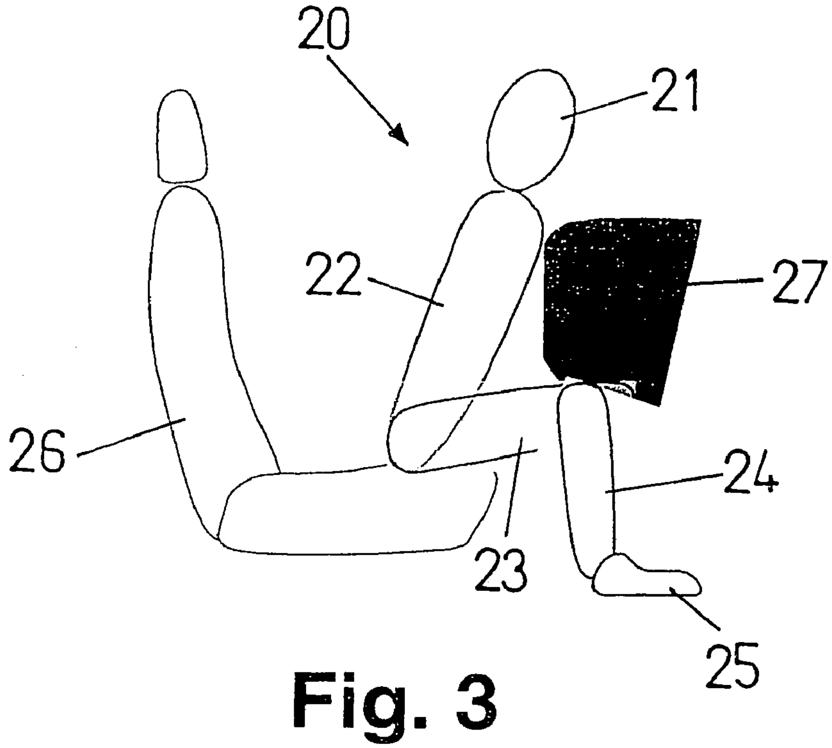
FIG. 3 shows the model shown in FIG. 2 of an occupant during an accident.

FIGS. 2 and 3 show five linked mass elements 21 through 25 as a standard model 20 for the front-seat passenger. Mass element 21 represents the head of the front-seat passenger; mass element 22 for the trunk is linked thereto. Appropriately located additional mass elements 23 through 25 are to simulate the behavior of the upper limbs, the lower limbs, and the feet of the front-seat passenger. FIG. 2 shows the situation before an accident. The front-seat passenger assumes a relaxed posture in front passenger seat 26. The trunk—mass element 22—and the upper limbs—mass element 23—form an angle of approximately 90°, while the upper limbs—mass element 23—and lower limbs—mass element 24—form a considerably greater angle. Dashboard 27 is located in front of the front-seat passenger. FIG. 3 shows the behavior of the front-seat passenger, i.e., model 20, in the event of a head-on impact. The entire person is pushed forward toward dashboard 27. Trunk—mass element 22—executes a tipping motion toward dashboard 27, so that the angle between trunk—mass element 22—and upper limbs—mass element 23—is reduced, as is the angle between the upper limbs—mass element 23—and lower limbs—mass element 24.

Using such a model and the recorded acceleration signals, the motions and in particular also the decelerations of the individual body parts during an accident may be determined relatively accurately. The injury extent and severity may be determined using the calculation method defined by law, which defines the severity of the head injury of a 1.80 m tall average man weighing 75 kg as HIC (Head Injury Criteria)

$$HIC = \left[ 1/t_2 - t_1 \int_{t_1}^{t_2} a\,dt \right]^{2.5} (t_2 - t_1)$$

where $t_2-t_1$ is a time interval of approximately 15 ms to 30 ms and a is the acceleration acting on the particular person. By combining this HIC value with individual-specific information, such as the actual height and actual weight, of the particular person, an individual probability of the occurrence of a head injury of the determined severity may be determined for this person. For this purpose, analyzer unit 2 has medical data available, which specifies the probability of certain injuries occurring in the event of a certain deceleration of a body part having a certain weight. Other formulas may also be used for computing the severity of injuries in the chest or abdomen area.

In the exemplary embodiment described herein, the motor vehicle is equipped with an interior sensing system 7, which permits information about the seat occupancy and the vehicle occupants in addition to other operating parameters to be obtained. Sensor mats which are mounted in the individual vehicle seats and make it possible to detect the pressure distribution in the particular seat are one component of interior sensing system 7. As a result, it is possible to determine whether a vehicle seat is occupied, and the pressure distribution in the seat also permits conclusions to be drawn regarding the weight of an occupant and provides information about his/her seat position at the beginning of a crash. Interior sensing system 7 may also include other sensors such as absolute weight sensors and a camera.

The information detected by interior sensing system 7 is used for adapting model 4, 5, or 6 to the particular occupant and is made available to transmitter unit 3, so that an emergency call automatically including information about the number of vehicle occupants and also optional information about which vehicle seats are occupied is placed in the event of an accident.

Because it may always be assumed that the driver's seat is occupied, the type and extent of the driver's injuries are always estimated. No such estimate is performed for vehicle seats known to be unoccupied. If, for a vehicle seat, it is impossible to reliably determine whether it is occupied, the type and extent of the injuries of a potential occupant are nevertheless determined. This information is then transmitted to the rescue coordination center indicating the uncertainty of occupancy.

In the following, two examples of an emergency call containing information about the seat occupancy are given.

Example 1:

Two injured persons

Driver's injury severity: MAIS 3

Head HIC 500, light chest injuries

Front-seat passenger's injury severity: MAIS 4

Head HIC 800, contact with dashboard, severe chest injuries, high probability of liver contusion Example 2:

Two to four injured persons

Driver: Minor injuries

Front-seat passenger: Injuries of moderate severity

Left rear seat: Minor injuries, uncertain whether seat is occupied

Right rear seat: No injuries, uncertain whether seat is occupied

Interior sensing system 7 in the exemplary embodiment described here also includes automatic child seat recognition based on transponder technology. In addition, the individual vehicle seats are equipped with receiving antennas which may be installed together with the sensor mats. Furthermore, an antenna emitting a test signal is provided. If there is a child seat having a transponder which has received the test signal, this transponder transmits a recognition signal back, which is received by the receiving antenna of the vehicle seat on which the child seat is installed. In addition to the information that there is a child seat present, the recognition signal may also include information about the type of child seat, i.e., whether it is a seat for an infant or a toddler. This permits conclusions to be drawn regarding the age, i.e., size and weight, of the child being transported. If there is information about the weight of the child being transported, it may also be used for occupant modeling and thus for estimating the type and extent of possible injuries. In addition, the result of such an automatic child seat recognition may be transmitted to the rescue coordination center together with the emergency call in the event of an accident.

In the exemplary embodiment described herein, the motor vehicle is also equipped with an occupant identification system 8, which may be used by the driver for identifying himself/herself to the vehicle to verify access authorization. Occupant identification system 8 accesses a database 9, which contains, in addition to identification features of the individuals having authorized access, further individual-specific information, such as age, blood type, or possible illnesses. This individual-specific information is also used for refining corresponding model 4, 5, or 6 or for estimating injury severity.

In addition, the estimate of injury type and extent may be improved on the basis of the information about the restraining means used, such as seat belt tensioners and air bags, and the time of their deployment. This information is provided in this case by air bag control unit 10.

A CAN bus 11 provides information about further boundary conditions influencing the risk of injury to the vehicle occupants, such as information about the positions and settings of the individual vehicle seats or information about whether the glove compartment was open at the beginning of a crash.

The information determined by analyzer unit 2 about the type and extent of occupant injuries is analyzed by a downstream logic module 12 to support a first aid provider using detailed information and optionally also instructions for action. For this purpose, individual-specific information is also provided to logic module 12 from database 9. The injuries of the individual occupants may be precisely described to the first aid provider via a voice output 13 and optionally also via an image output, and first aid suggestions may be given. For this purpose, logic module 12 accesses a database (not illustrated here), in which appropriate treatment steps are described for different injuries. Such a database may be stored in the controller of the vehicle.

In addition, in the exemplary embodiment described herein, communication may be established with an external database or the rescue coordination center, so that these may support the first aid provider with advice. The emergency-call device includes for this purpose a removable stereo video camera 14 which records all occupants in the vehicle. This stereo video camera 14 may be removed after an accident to transmit detailed images of the injured to the rescue coordination center. However, any other type of camera system may also be used.

What is claimed is:

1. An emergency-call device for a motor vehicle, comprising:

a sensor system for detecting an acceleration acting on at least one of the vehicle and an occupant of the vehicle, an analyzer unit;

a transmitter unit for automatically placing an emergency call; and an arrangement for estimating a type and extent of an injury of the occupant, the estimating being based on a model of the occupant, wherein the model of the occupant includes linked masses representing physical parts of the occupant, and parameters of the model of the occupant are adapted to an individual occupant, and wherein the transmitter unit transmits information obtained by the arrangement about injury type and extent to a rescue coordination center together with the emergency call.

2. The emergency-call device as recited in claim 1, further comprising:

an interior sensing system, wherein:

the information is taken into account when estimating the type and extent of the injury of the occupant.

3. The emergency-call device as recited in claim 2, wherein the interior sensing system includes an arrangement for detecting seat occupancy.

4. The emergency-call device as recited in claim 2, wherein the interior sensing system includes at least one of a sensor mat and an absolute weight measuring sensor for detecting seat occupancy.

5. The emergency-call device as recited in claim 2, wherein the interior sensing system includes an automatic child seat sensor.

6. The emergency-call device as recited in claim 2, wherein the interior sensing system includes at least one video camera.

7. The emergency-call device as recited in claim 2, further comprising:

an arrangement for inputting individual-specific data of at least one user, wherein the individual-specific data is taken into account when estimating the type and extent of the injury of the occupant.

8. The emergency-call device as recited in claim 1, wherein information about at least one of a type of a restraining device used and a time of deployment is taken into account when estimating the type and extent of the injury of the occupant.

9. The emergency-call device as recited in claim 1, further comprising:

at least one of an optical output system and an acoustic output system, via which information about a recommended first aid measure is made available to a first aid provider, wherein the at least one of the optical output system and the acoustic output system reads the corresponding information from a database on the basis of a previously determined type and extent of injury of the occupant.

10. The emergency-call device as recited in claim 9, further comprising:

an arrangement for bidirectional communication with at least one of an external database and a further helper.

11. The emergency-call device as recited in claim 1, further comprising:

an interior sensing system, wherein:

the information is taken into account when modeling the occupant.

12. The emergency-call device as recited in claim 6, wherein the at least one video camera includes a removable stereo video camera.

13. The emergency-call device as recited in claim 1, wherein the model of the occupant includes eight mass elements representing head, trunk, two upper limbs, two lower limbs and two feet.

14. The emergency-call device as recited in claim 2, wherein parameters of the model of the occupant are adapted to the individual occupant based on information detected by the interior sensing system.

* * * * *